US012637001B1

(12) United States Patent
Tarchala et al.

(10) Patent No.: US 12,637,001 B1
(45) Date of Patent: May 26, 2026

(54) CONTROL SYSTEM AND METHOD FOR ENHANCING VEHICLE DRIVING EXPERIENCE

(71) Applicant: HONDA MOTOR CO., LTD., Tokyo (JP)

(72) Inventors: Christopher John Tarchala, Los Angeles, CA (US); Gypsy R. Modina, Redondo Beach, CA (US); Yuyan Chen, Los Angeles, CA (US); Chanmi Lee, Torrance, CA (US); Jaehyung Jo, Pasadena, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 19/336,237

(22) Filed: Sep. 22, 2025

(51) Int. Cl.
| | |
|---|---|
| *B60Q 3/76* | (2017.01) |
| *B62D 1/18* | (2006.01) |
| *G06T 7/70* | (2017.01) |
| *G06V 10/141* | (2022.01) |
| *G06V 20/59* | (2022.01) |
| *G06V 40/10* | (2022.01) |

(Continued)

(52) U.S. Cl.
CPC ................ *B60Q 3/76* (2017.02); *B62D 1/18* (2013.01); *G06T 7/70* (2017.01); *G06V 10/141* (2022.01); *G06V 20/593* (2022.01); *G06V 20/597* (2022.01); *G06V 40/10* (2022.01); *G06V 40/20* (2022.01); *B60Q 2500/30* (2022.05); *F21W 2106/00* (2018.01); *G06T 2207/30196* (2013.01); *G06T 2207/30242* (2013.01); *G06T 2207/30268* (2013.01)

(58) Field of Classification Search
CPC .. B60Q 2500/30; B60Q 3/76; F21W 2106/00; G06V 10/141; G06V 20/593
See application file for complete search history.

(56) References Cited

U.S. PATENT DOCUMENTS

| | | | |
|---|---|---|---|
| 2,436,153 | A | 2/1948 | Sanmori |
| 2,839,312 | A | 6/1958 | Barenyi et al. |
| 4,299,407 | A | 11/1981 | Simson |

(Continued)

FOREIGN PATENT DOCUMENTS

| | | |
|---|---|---|
| DE | 10207912 A1 | 9/2003 |
| EP | 0634302 A1 | 1/1995 |

(Continued)

*Primary Examiner* — Sean P Gramling
(74) *Attorney, Agent, or Firm* — Aaron Fong; American Honda Motor Co., Inc.

(57) ABSTRACT

A control system for enhancing a vehicle driving experience is disclosed. The control system comprises a lighting system disposed within a vehicle and is at least configured to illuminate one or more locations on one or more passenger seats of the vehicle. The control system further comprises at least one sensor configured to generate an input signal indicative of a number of persons entering the vehicle and/or present within the vehicle. The control system further comprises a controller communicably coupled with the at least one sensor and the lighting system. The controller is configured to determine the number of persons entering the vehicle and/or present within the vehicle. The controller is further configured to control the lighting system to illuminate any one of a central location on a passenger seat from the one or more passenger seats or at least two locations on the one or more passenger seats.

17 Claims, 5 Drawing Sheets

(51) Int. Cl.
　　*G06V 40/20*　　　　(2022.01)
　　*F21W 106/00*　　　　(2018.01)

(56)　　　　　　　References Cited

U.S. PATENT DOCUMENTS

| | | | |
|---|---|---|---|
| 5,101,751 | A | 4/1992 | Kobayashi |
| 5,372,082 | A | 12/1994 | Hattori |
| 2005/0279541 | A1 | 12/2005 | Peters |
| 2008/0112175 | A1* | 5/2008 | Bucher .................... B60Q 3/74 |
| | | | 362/490 |
| 2014/0244106 | A1* | 8/2014 | Singer ..................... F16H 59/52 |
| | | | 701/36 |
| 2016/0075275 | A1* | 3/2016 | Salter ...................... B60Q 3/74 |
| | | | 315/77 |
| 2020/0254906 | A1 | 8/2020 | Luchner et al. |
| 2024/0351630 | A1 | 10/2024 | Anheier et al. |

FOREIGN PATENT DOCUMENTS

| | | | |
|---|---|---|---|
| ES | 2147117 | A1 | 8/2000 |
| JP | H06122336 | A | 5/1994 |

* cited by examiner

CONTROL SYSTEM AND METHOD FOR ENHANCING VEHICLE DRIVING EXPERIENCE

BACKGROUND

The disclosed subject matter relates generally to a vehicle. More particularly, the disclosed subject matter relates to a control system and a method for enhancing a vehicle driving experience.

As such, automotive manufacturers continually develop mechanical and electrical systems to enhance a vehicle driving experience. Such mechanical and electrical systems aim to immerse drivers in pure and uninterrupted joy of driving. In some cases, customizing an interior detailing of the vehicle such as, customizing lights within an interior of the vehicle, may enhance the vehicle driving experience. An enhanced vehicle driving experience may increase user satisfaction and may allow a driver to have a relaxed state of mind while driving.

SUMMARY

In accordance with one embodiment of the present disclosure, a control system for enhancing a vehicle driving experience is disclosed. The control system comprises a lighting system disposed within a vehicle. The lighting system is at least configured to illuminate one or more locations on one or more passenger seats of the vehicle. The control system further comprises at least one sensor configured to generate an input signal indicative of a number of persons entering the vehicle and/or present within the vehicle. The control system further comprises a controller communicably coupled with the at least one sensor and the lighting system. The controller is configured to determine the number of persons entering the vehicle and/or present within the vehicle based on the input signal received from the at least one sensor. The controller is further configured to control, based on the number of persons entering the vehicle and/or present within the vehicle, the lighting system to illuminate any one of a central location on a passenger seat from the one or more passenger seats or at least two locations on the one or more passenger seats.

In accordance with another embodiment of the present disclosure, a vehicle is disclosed. The vehicle comprises a frame defining an interior space. The vehicle further comprises a control system for enhancing a vehicle driving experience. The control system comprises a lighting system disposed within the vehicle. The lighting system is at least configured to illuminate one or more locations on one or more passenger seats of the vehicle. The control system further comprises at least one sensor coupled to the frame and disposed within the interior space. The at least one sensor is configured to generate an input signal indicative of a number of persons entering the vehicle and/or present within the vehicle. The control system further comprises a controller communicably coupled with the at least one sensor and the lighting system. The controller is configured to determine the number of persons entering the vehicle and/or present within the vehicle based on the input signal received from the at least one sensor. The controller is further configured to control, based on the number of persons entering the vehicle and/or present within the vehicle, the lighting system to illuminate any one of a central location on a passenger seat from the one or more passenger seats or at least two locations on the one or more passenger seats.

In accordance with yet a further embodiment of the present disclosure, a method for enhancing a vehicle driving experience is disclosed. The method comprises generating, by at least one sensor associated with a vehicle, an input signal indicative of a number of persons entering the vehicle and/or present within the vehicle. The method further comprises determining, by a controller associated with the vehicle, the number of persons entering the vehicle and/or present within the vehicle based on the input signal received from the at least one sensor. The controller is communicably coupled with the at least one sensor and a lighting system disposed within the vehicle. The lighting system is at least configured to illuminate one or more locations on one or more passenger seats of the vehicle. The method further comprises controlling, by the controller, the lighting system to illuminate any one of a central location on a passenger seat from the one or more passenger seats or at least two locations on the one or more passenger seats based on the number of persons entering the vehicle and/or present within the vehicle.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
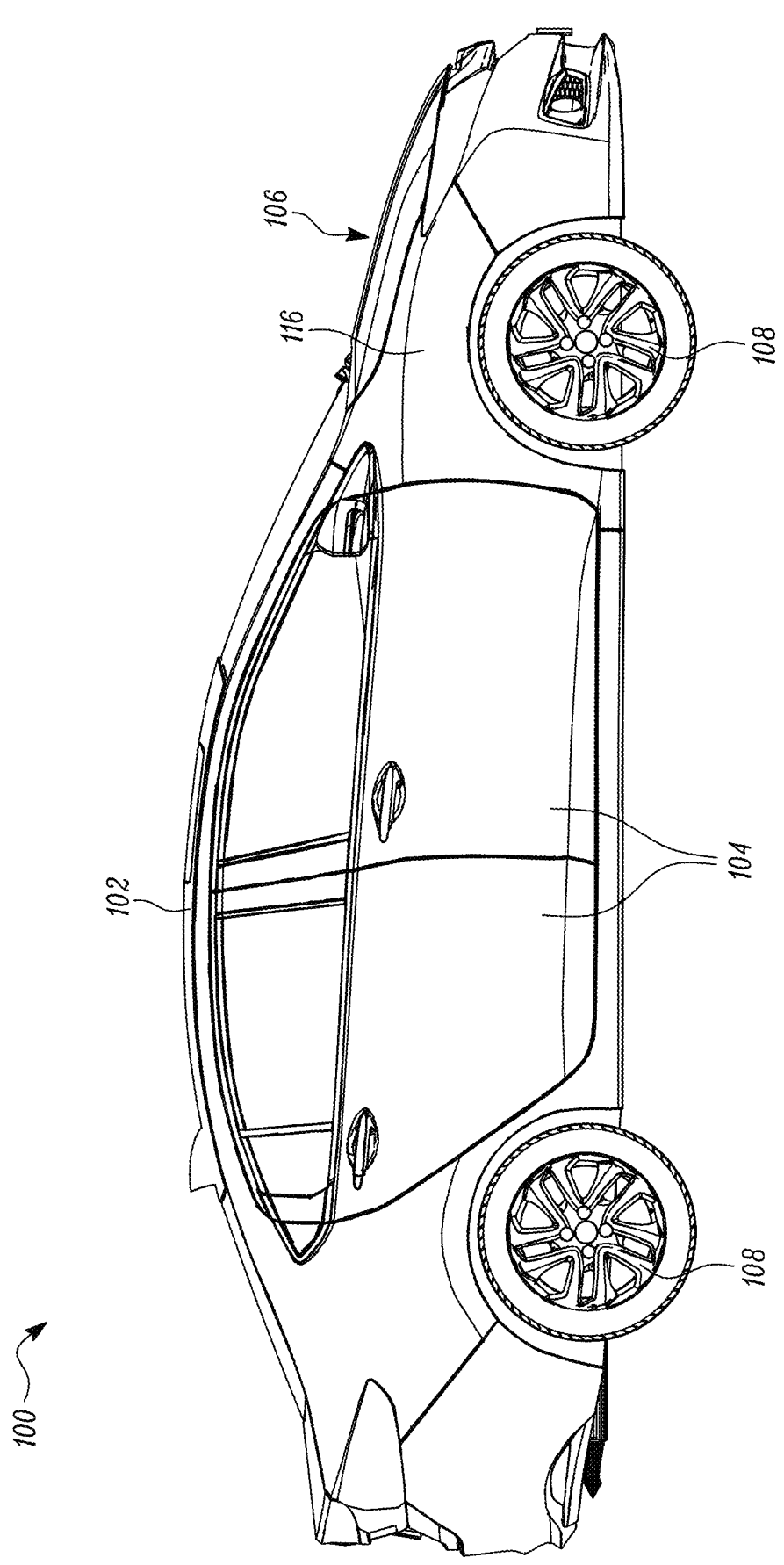
FIG. 1 is a schematic side view of a vehicle, in accordance with an embodiment of the present disclosure.

FIG. 1 illustrates a schematic side view of a vehicle 100, in accordance with an embodiment of the present disclosure. As shown, the vehicle 100 includes a frame 102. The vehicle 100 also includes at least one door 104 coupled to the frame 102. It should be noted that the vehicle 100 can include two doors in total or four doors in total. In the illustrated embodiment of FIG. 1, the vehicle 100 includes four doors, however, only two doors are shown in the view depicted in FIG. 1. The frame 102 defines a compartment 106 to accommodate a power source (not shown) of the vehicle 100. The compartment 106 may be located anywhere on the vehicle 100. The vehicle 100 further includes a plurality of wheels 108 for supporting the frame 102 on a ground surface (not shown). The wheels 108 enable a movement of the vehicle 100 over the ground surface. Although the vehicle 100 is shown as a passenger car herein, it may be appreciated that the vehicle 100 may include any other type of vehicle, as per desired application attributes (e.g., truck, two-wheeled, electric, hybrid, compact, etc.).

Figure 2:
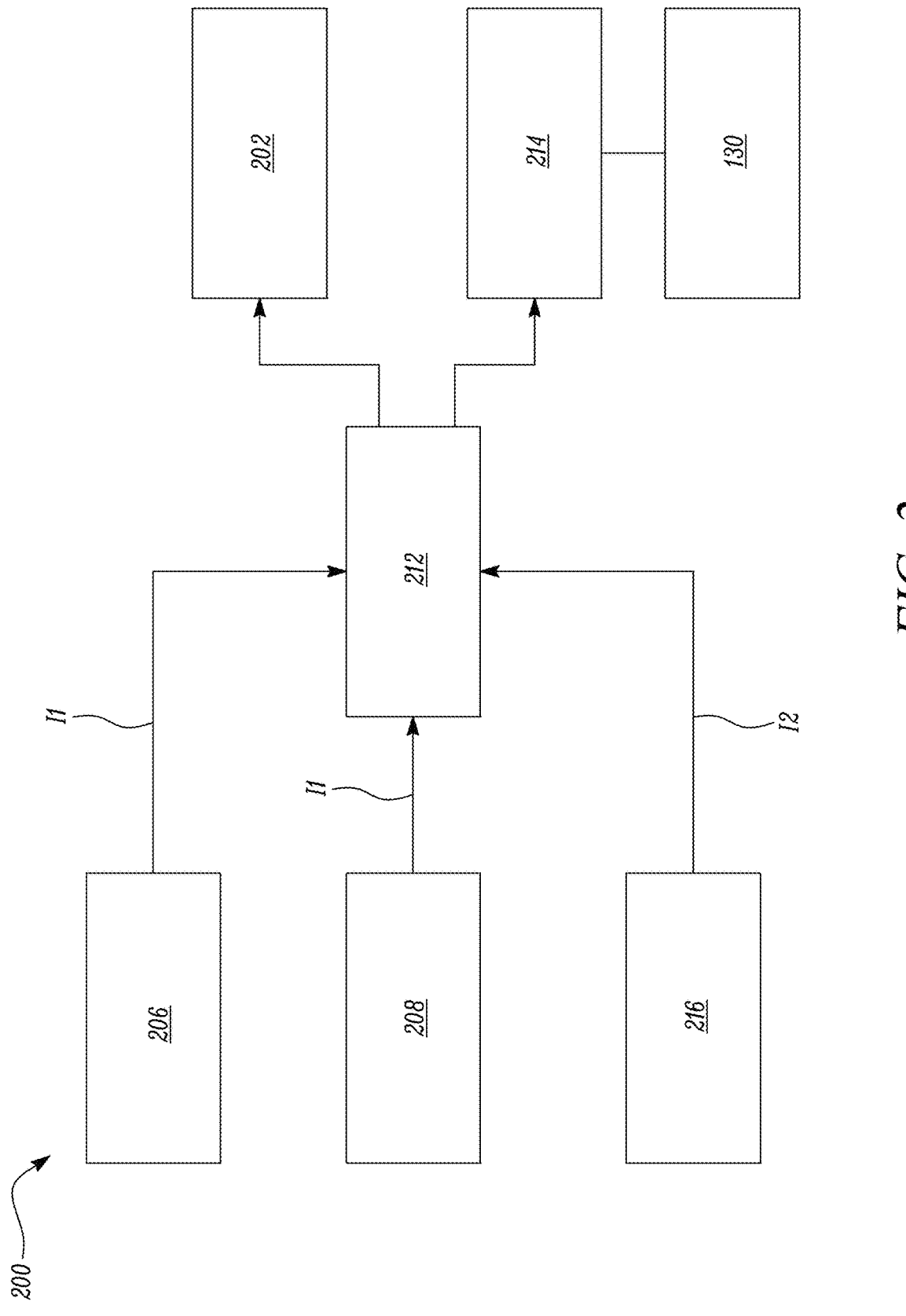
FIG. 2 is a block diagram of a control system for enhancing a vehicle driving experience associated with the vehicle of FIG. 1, in accordance with an embodiment of the present disclosure.
Figure 3:
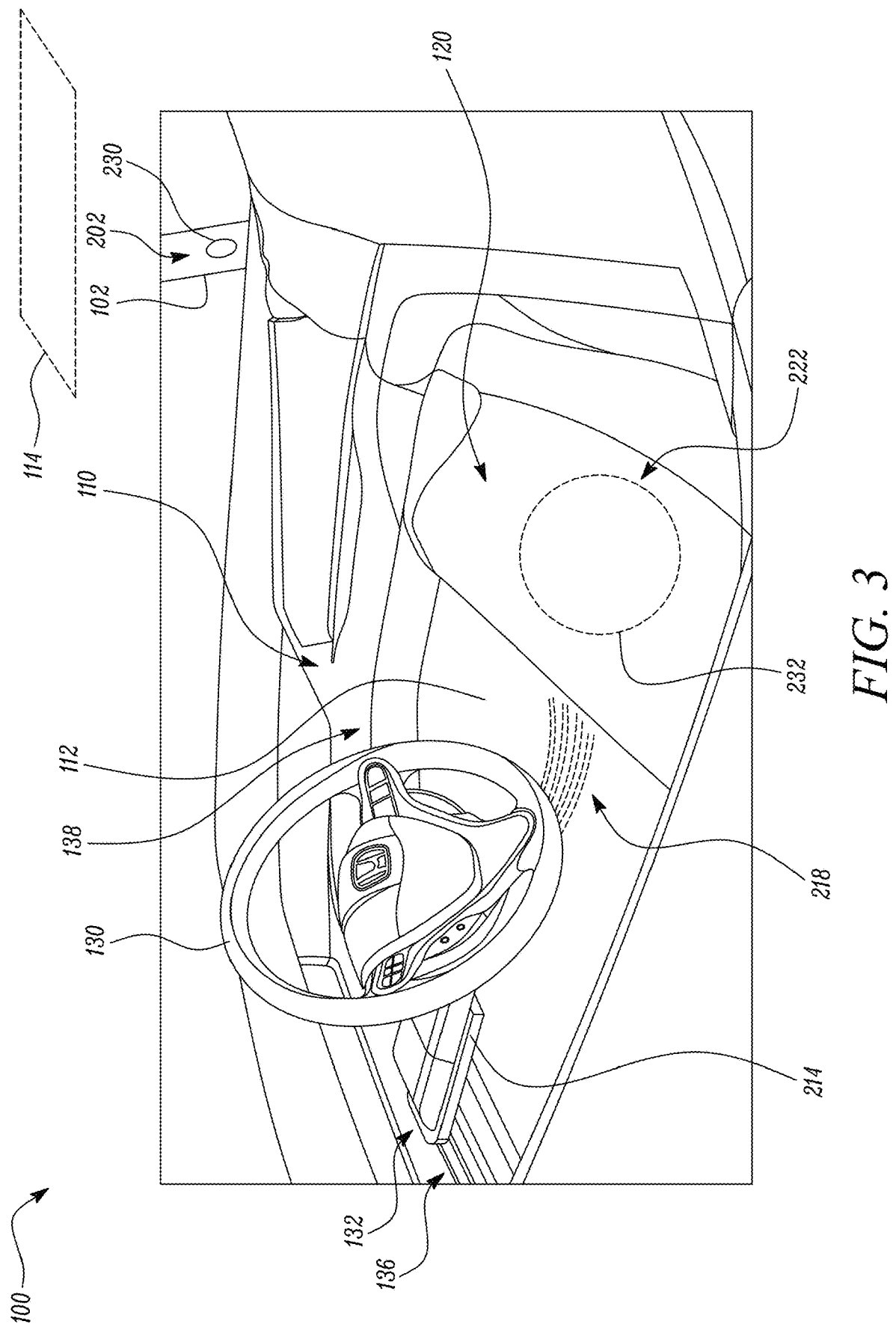
FIG. 3 is a perspective view of an interior of the vehicle of FIG. 1 illustrating illumination of a central location of a passenger seat of the vehicle, in accordance with an embodiment of the present disclosure.

FIG. 2 is a block diagram of a control system 200 for enhancing a vehicle driving experience, in accordance with an embodiment of the present disclosure. FIG. 3 is a perspective view of an interior of the vehicle 100 of FIG. 1, in accordance with an embodiment of the present disclosure.

Referring now to FIG. 2 and FIG. 3, the frame 102 defines an interior space 110. The vehicle 100 includes a steering wheel 130 disposed in the interior space 110 to steer the vehicle 100 as desired. Further, the vehicle 100 includes one or more passenger seats 120 disposed in the interior space 110. A single passenger seat 120 at a front end of the vehicle 100 is depicted herein. However, the vehicle 100 may include two separate passenger seats at a front end. Additionally, the vehicle 100 may include one or more passenger seats 120 at a rear end of the vehicle 100. Further, the vehicle 100 includes a floor 112. The vehicle 100 may additionally include a number of features disposed within the vehicle 100 that have not been described herein.

The control system 200 includes a lighting system 202 disposed within the vehicle 100. Specifically, the lighting system 202 is disposed within the interior space 110. The lighting system 202 is at least configured to illuminate one or more locations 222, 226, 228 (see FIG. 3 and FIG. 4) on the one or more passenger seats 120 of the vehicle 100.

In some embodiments, the lighting system 202 includes at least one light source 230 that is disposed within the vehicle 100 and coupled to the frame 102 of the vehicle 100. In an example, the light source 230 may include a light emitting diode (LED), without any limitations. The light source 230 may be battery operated and may be operated by the power source (not shown) of the vehicle 100. A single light source 230 coupled to the frame 102 is depicted in FIG. 3 as an example. However, the lighting system 202 may include any number of light sources and any type of light source and at any location of the interior space 110, as per application requirements. Further, the light source 230 may generate a light of any color, pattern, size, or motion. In some examples, the light source 230 may generate lights of different colors, and a color of light emitted by the light source 230 may be customized as per user preference. In general, the light source 230 may generate lights based on a preset user/passenger customization (such as through a passenger profile) or based on passenger behaviors (e.g., if a passenger approaching the vehicle 100 has a pattern of sitting in the same seat 120, then light source 230 is configured to project a light on that seat 120).

The control system 200 further includes at least one sensor 206, 208. The at least one sensor 206, 208 is configured to generate an input signal I1 indicative of a number of persons entering the vehicle 100 and/or present within the vehicle 100. In some embodiments, the at least one sensor 206, 208 includes any one of a camera, a light detection and ranging (LIDAR) sensor, and a radio detection and ranging (RADAR) sensor. The present disclosure is not limited by a type of the sensor 206, 208 and/or a number of the sensor 206, 208.

In some embodiments, the at least one sensor 206, 208 includes a first sensor 206 disposed within the vehicle 100 and/or a second sensor 208 disposed on an exterior surface 116 (see FIG. 1) of the vehicle 100. The sensor 206 is hereinafter interchangeably referred to as "the first sensor 206". The sensor 208 is hereinafter interchangeably referred to as "the second sensor 208". In an example, the first sensor 206 may be a camera disposed inside the vehicle 100 and the second sensor 208 may be a camera disposed outside the vehicle 100. Further, the first sensor 206 may include a single first sensor 206 or multiple first sensors 206. Moreover, the second sensor 208 may include a single second sensor 208 or multiple second sensors 208. It may be further contemplated that the control system 200 may include any one of the first sensor 206 and the second sensor 208, or the control system 200 may include each of the first sensor 206 and the second sensor 208.

The control system 200 further includes a controller 212 communicably coupled with the at least one sensor 206, 208 and the lighting system 202. The controller 212 is configured to determine the number of persons entering the vehicle 100 and/or present within the vehicle 100 based on the input signal I1 received from the at least one sensor 206, 208. The controller 212 is configured to control the lighting system 202 to illuminate any one of a central location 222 on the passenger seat 120 from the one or more passenger seats 120 or at least two locations 226, 228 on the one or more passenger seats 120 based on the number of persons entering the vehicle 100 and/or present within the vehicle 100. The location 222 is hereinafter interchangeably referred to as "the central location 222", and the locations 226, 228 are hereinafter interchangeably referred to as "adjacent locations 226, 228".

In some embodiments, the controller 212 is further configured to control the lighting system 202 to illuminate based on one or more of a lighting configuration set by one of the persons and a predetermined seating behavior of one of the persons.

The controller 212 may include one or more memories (not shown) and one or more processors (not shown). The one or more processors are communicably coupled with each of the one or more memories and the at least one sensor 206, 208. The one or more memories may store instructions that are executable by the one or more processors, an operating system, and other data or information. The one or more memories may include any means of storing information, including a hard disk, an optical disk, a floppy disk, ROM (read only memory), RAM (random access memory), PROM (programmable ROM), EEPROM (electrically erasable PROM), or other computer-readable memory media.

It should be noted that the one or more processors may embody a single microprocessor or multiple microprocessors for receiving various input signals and generating output signals. Numerous commercially available microprocessors may perform the functions of the one or more processors. The one or more processors may further include a general processor, a central processing unit, an application specific integrated circuit (ASIC), a digital signal processor, a field programmable gate array (FPGA), a digital circuit, an analog circuit, a microcontroller, any other type of processor, or any combination thereof. The one or more processors may include one or more components that may be operable to execute computer executable instructions or computer code that may be stored and retrieved from the one or more memories.

In some embodiments, the controller 212 is configured to determine the number of persons entering the vehicle 100 and/or present within the vehicle 100 based on an input signal 12 received from a software application 216 linked with the vehicle 100. The input signal 12 is indicative of the number of persons entering the vehicle 100 and/or present within the vehicle 100. The software application 216 is communicably coupled with the controller 212. The software application 216 may be installed on a smartphone, a tablet, a laptop, or any other device. In other examples, the software application 216 may embody a key-in device that may be used to enter the vehicle 100. It should be noted that the control system 200 may include any other device to determine a total number of persons entering the vehicle 100.

In some embodiments, the control system 200 further includes an adjustment mechanism 214 communicably coupled with the controller 212 and operatively coupled with the steering wheel 130 of the vehicle 100. The adjustment mechanism 214 is configured to slide the steering wheel 130 along a horizontal plane 114 (see FIG. 3 and FIG. 4) to adjust a position of the steering wheel 130. In some examples, the adjustment mechanism 214 may include a slider, a shaft, a solenoid, an actuator, and so on to slide the steering wheel 130 along the horizontal plane 114.

The controller 212 is configured to control, via the adjustment mechanism 214, the steering wheel 130 to dispose the steering wheel 130 at a central position 132 based on determining that a single person has entered the vehicle 100 and/or is present within the vehicle 100. Alternatively, the controller 212 is configured to control, via the adjustment mechanism 214, the steering wheel 130 to dispose the steering wheel 130 at any one of a left side 136 of the central position 132 or a right side 138 of the central position 132 based on determining that more than one person has entered the vehicle 100. For example, when a driver of the vehicle 100 is seated at the left side 136, the adjustment mechanism 214 moves the steering wheel 130 to the left side 136 so that the driver can comfortably drive the vehicle. Alternatively, when the driver of the vehicle 100 is seated at the right side 138, the adjustment mechanism 214 moves the steering wheel 130 to the right side 138 so that the driver can comfortably drive the vehicle 100. Generally, the adjustment mechanism 214 may adjust the position of the steering wheel 130 at any location based on a number of persons entering the vehicle 100 and/or present within the vehicle 100. In some examples, the adjustment mechanism 214 may adjust the position of the steering wheel 130 based on whether the vehicle 100 is equipped with a left-hand drive system or a right-hand drive system.

In some embodiments, the lighting system 202 is also configured to illuminate a steering wheel position light 218 on the floor 112 of the vehicle 100. Specifically, the controller 212 is configured to control the lighting system 202 to illuminate the steering wheel position light 218 on the floor 112 of the vehicle 100. The steering wheel position light 218 may be in alignment with the steering wheel 130 to invite the driver to assume a position in front of the steering wheel 130. The position of the steering wheel position light 218 may vary with a current position of the steering wheel 130. Accordingly, if the single person has entered the vehicle 100 and/or is present within the vehicle 100, the steering wheel position light 218 may be centrally aligned. However, if more than one person has entered the vehicle 100, the steering wheel position light 218 may either illuminates the floor 112 at the left side 136 or the right side 138, as per a seating position of the driver of the vehicle 100. In some examples, the light source 230 itself may illuminate the steering wheel position light 218 and/or in addition to the steering wheel 130 itself. Alternatively, the passenger seat 120 and the steering wheel position light 218 may be illuminated by different light sources. Further, in some cases, the steering wheel position light 218 may include a number of curved illuminated lines, whereas the illumination of the central location 222 may include a soft illumination (e.g., a transparent white airflow motion) at the central location 222 on the passenger seat 120. Thus, the patterns of the steering wheel position light 218 and the illumination at the central location 222 may be different herein.

In the illustrated embodiment of FIG. 3, the controller 212 (see FIG. 2) is configured to determine that the single person has entered the vehicle 100 and/or is present within the vehicle 100. It should be noted that the single person is not depicted in FIG. 3. The controller 212 is configured to control the lighting system 202 to illuminate the central location 222 on the passenger seat 120 from the one or more passenger seats 120 based on determining that the single person has (or more people have) entered the vehicle 100 and/or is present within the vehicle 100. Specifically, the lighting system 202 may illuminate a single, central illuminated spot 232 at the central location 222 on the passenger seat 120 based on determining that the single person has (or more people have) entered the vehicle 100 and/or is present within the vehicle 100. Furthermore, the controller 212 controls the steering wheel 130 to dispose the steering wheel 130 at the central position 132 based on determining that the single person has (or more people have) entered the vehicle 100 and/or is present within the vehicle 100. Moreover, the controller 212 controls the lighting system 202 to illuminate the steering wheel position light 218 on the floor 112 of the vehicle 100, such that the steering wheel position light 218 is in alignment with the steering wheel 130.

Figure 4:
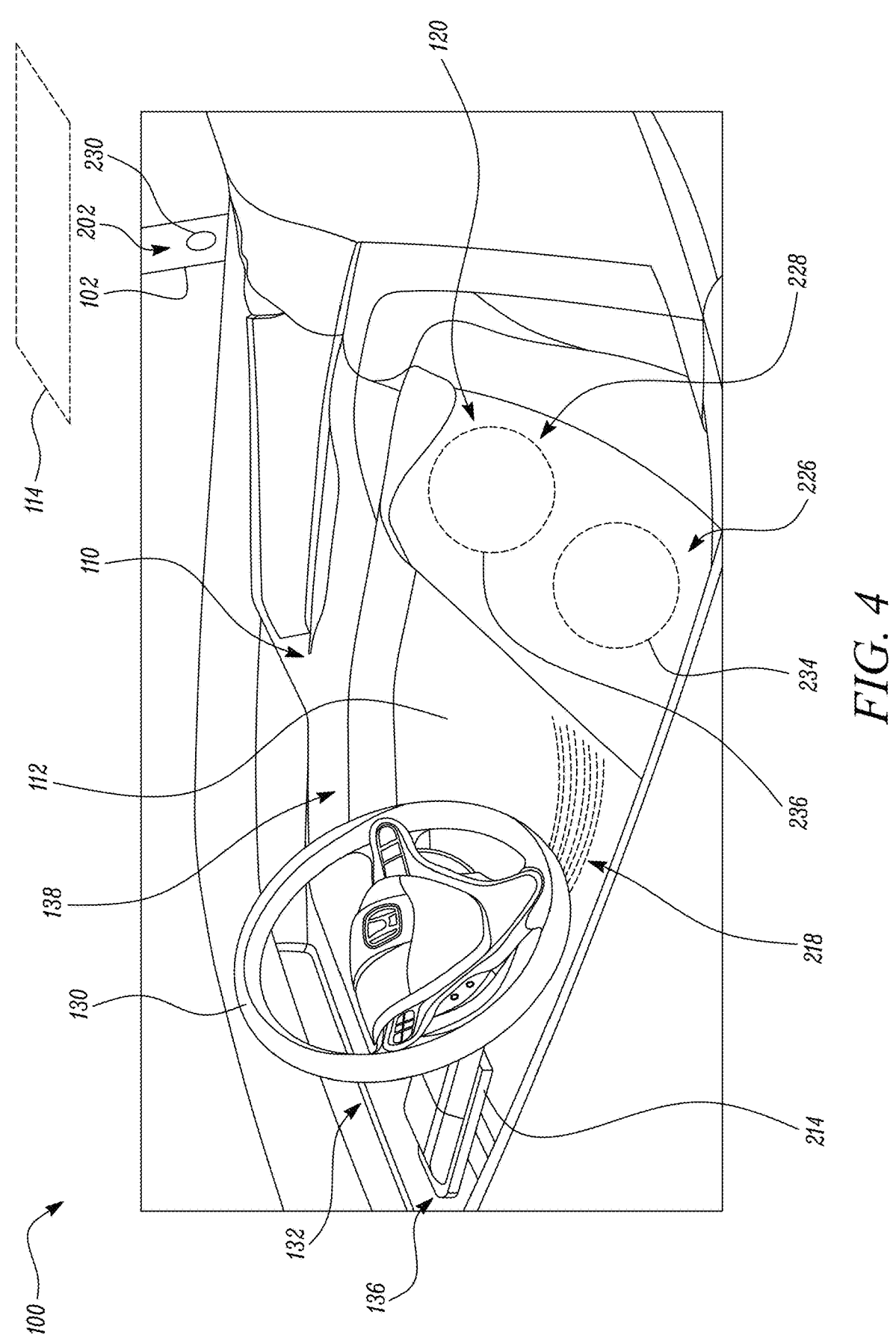
FIG. 4 is a perspective view of the interior of the vehicle of FIG. 1 illustrating illumination of two adjacent locations of the passenger seat of the vehicle, in accordance with another embodiment of the present disclosure.

FIG. 4 is a perspective view of the interior of the vehicle 100 of FIG. 1 illustrating illumination of two adjacent locations 226, 228 of the passenger seat 120 of the vehicle 100, in accordance with another embodiment of the present disclosure. It is noted that non-adjacent seating locations may also be considered for illumination of a passenger's seat 120. For instance, a seating row comprising three or more passenger seats may be configured to illuminate two or more seats that are non-adjacent to each other. The embodiment of adjacent locations herein is merely exemplary.

Referring to FIGS. 2 and 4, the controller 212 is configured to determine that at least two persons have entered the vehicle 100 and/or are present within the vehicle 100. It should be noted that the at least two persons are not depicted in FIG. 4. The controller 212 is configured to control the lighting system 202 to illuminate the at least two locations 226, 228 on the one or more passenger seats 120 based on determining that the at least two persons have entered the vehicle 100 and/or are present within the vehicle 100. Specifically, the lighting system 202 illuminates a first illuminated spot 234 and a second illuminated spot 236 at the respective locations 226, 228 on the passenger seat 120 based on determining that the at least two persons have entered the vehicle 100 and/or are present within the vehicle 100.

Furthermore, the controller 212 controls the steering wheel 130 to dispose the steering wheel 130 at the left side 136 of the central position 132 based on determining that the at least two persons have entered the vehicle 100 and/or are present within the vehicle 100. Moreover, the controller 212 controls the lighting system 202 to illuminate the steering wheel position light 218 on the floor 112 of the vehicle 100, such that the steering wheel position light 218 is in alignment with the steering wheel 130. Generally, the controller 212 may control the steering wheel 130 to dispose the steering wheel 130 at any position based on determining the number of people that have entered the vehicle 100 and/or are present within the vehicle 100.

Figure 5:
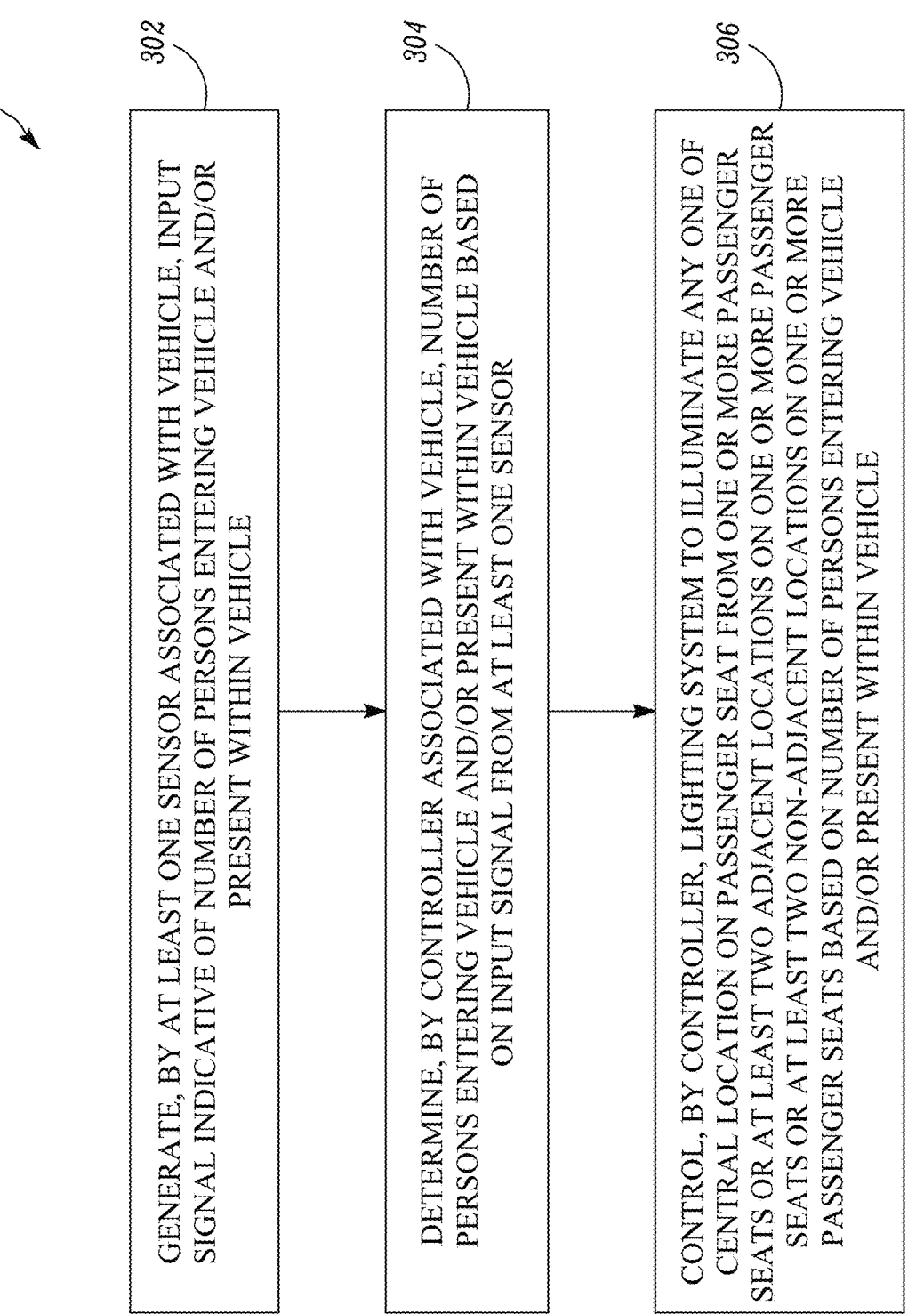
FIG. 5 is a flowchart of a method for enhancing a vehicle driving experience, in accordance with an embodiment of the present disclosure.

FIG. 5 is a flowchart of a method 300 for enhancing the vehicle driving experience, in accordance with an embodiment of the present disclosure. Referring now to FIGS. 1 to 5, at step 302, the at least one sensor 206, 208 associated with the vehicle 100 generates the input signal I1 indicative of the number of persons entering the vehicle 100 and/or present within the vehicle 100.

At step 304, the controller 212 associated with the vehicle 100 determines the number of persons entering the vehicle 100 and/or present within the vehicle 100 based on the input signal I1 received from the at least one sensor 206, 208. The controller 212 is communicably coupled with the at least one sensor 206, 208 and the lighting system 202 disposed within the vehicle 100. The lighting system 202 is at least configured to illuminate the one or more locations 222, 226, 228 on the one or more passenger seats 120 of the vehicle 100. In some embodiments, at the step 304, the controller 212 receives the input signal I2 that is indicative of the number of persons entering the vehicle 100 and/or present within the vehicle 100 from the software application 216 linked with the vehicle 100. The software application 216 is communicably coupled with the controller 212. Furthermore, at the step 304, the controller 212 determines the number of persons entering the vehicle 100 and/or present within the vehicle 100 based on a receipt of the input signal I2 from the software application 216.

At step 306, the controller 212 controls the lighting system 202 to illuminate any one of the central location 222 on the passenger seat 120 from the one or more passenger seats 120 or at least two locations 226, 228 on the one or more passenger seats 120 or at least two non-adjacent locations (not shown) on the one or more passenger seats 120 based on the number of persons entering the vehicle 100 and/or present within the vehicle 100.

In some embodiments, at the step 306, the controller 212 determines that the single person has entered the vehicle 100 and/or is present within the vehicle 100. Furthermore, at the step 306, the controller 212 controls the lighting system 202 to illuminate the central location 222 on the passenger seat 120 from the one or more passenger seats 120 based on determining that the single person has entered the vehicle 100 and/or is present within the vehicle 100.

In some embodiments, at the step 306, the controller 212 determines that at least two persons have entered the vehicle 100 and/or are present within the vehicle 100. Furthermore, at the step 306, the controller 212 controls the lighting system 202 to illuminate the at least two locations 226, 228 on the one or more passenger seats 120 based on determining that at least two persons have entered the vehicle 100 and/or are present within the vehicle 100.

In some embodiments, the adjustment mechanism 214 of the vehicle 100 is communicably coupled with the controller 212 and operatively coupled with the steering wheel 130 of the vehicle 100. The adjustment mechanism 214 is configured to slide the steering wheel 130 along the horizontal plane 114 to adjust the position of the steering wheel 130. The method 300 further includes a step (not shown) at which the controller 212 controls the adjustment mechanism 214 to dispose the steering wheel 130 at the central position 132 based on determining that the single person has entered the vehicle 100 and/or is present within the vehicle 100. The method 300 further includes a step (not shown) at which the controller 212 controls the adjustment mechanism 214 to dispose the steering wheel 130 at any one of the left side 136 of the central position 132 or the right side 138 of the central position 132 based on determining that more than one person has entered the vehicle 100.

In some embodiments, the lighting system 202 is also configured to illuminate the steering wheel position light 218 on the floor 112 of the vehicle 100. The method 300 further includes a step (not shown) at which the controller 212 controls the lighting system 202 to illuminate the steering wheel position light 218 on the floor 112 of the vehicle 100. The steering wheel position light 218 is in alignment with the steering wheel 130. The position of the steering wheel position light 218 varies with the current position of the steering wheel 130.

The control system 200 described herein illuminates the one or more passenger seats 120 to indicate an optimal seating location based on the number of persons entering the vehicle 100 and/or present within the vehicle 100, which may enhance an overall comfort, aesthetics, and driving experience of vehicle users. Additionally, the adjustment mechanism 214 associated with the control system 200 may automatically and optimally position the steering wheel 130 as per the seating position of the driver, thereby ensuring that the driver has the best possible field of view and has easy access to vehicle controls, thereby improving the vehicle driving experience. In an example, when the single person enters the vehicle 100, the lighting system 202 illuminates the central location 222 of the passenger seat 120 to encourage the person to occupy the central location 222 of the passenger seat 120, thereby creating a sense of personal space within the vehicle 100.

The control system 200 and the method 300 described herein may be simple and cost effective to incorporate. Further the control system 200 and the method 300 may be retrofitted in existing vehicles. Moreover, an automatic adjustment of the steering wheel 130 may further enhance user experience by reducing the hassle of self-adjusting the steering wheel 130 when users enter the vehicle 100.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended that the scope of the disclosure be defined by the claims appended hereto.

What is claimed is:

1. A control system for enhancing a vehicle driving experience, the control system comprising:
   a lighting system disposed within a vehicle, wherein the lighting system is at least configured to illuminate one or more locations on one or more passenger seats of the vehicle;
   at least one sensor configured to generate an input signal indicative of a number of persons entering the vehicle and/or present within the vehicle; and
   a controller communicably coupled with the at least one sensor and the lighting system, the controller being configured to:

determine the number of persons entering the vehicle and/or present within the vehicle based on the input signal received from the at least one sensor; and control, based on the number of persons entering the vehicle and/or present within the vehicle, the lighting system to illuminate any one of a central location on a passenger seat from the one or more passenger seats or at least two locations on the one or more passenger seats;

an adjustment mechanism communicably coupled with the controller and operatively coupled with a steering wheel of the vehicle, wherein the adjustment mechanism is configured to slide the steering wheel along a horizontal plane to adjust a position of the steering wheel, and wherein the controller is further configured to:

control, via the adjustment mechanism, the steering wheel to dispose the steering wheel at a central position based on determining that a single person has entered the vehicle and/or is present within the vehicle; or control, via the adjustment mechanism, the steering wheel to dispose the steering wheel at any one of a left side of the central position or a right side of the central position based on determining that more than one person has entered the vehicle.

2. The control system of claim 1, wherein the lighting system is also configured to illuminate a steering wheel position light on a floor of the vehicle, and wherein the controller is further configured to:

control the lighting system to illuminate the steering wheel position light on the floor of the vehicle, wherein the steering wheel position light is in alignment with the steering wheel, and wherein a position of the steering wheel position light varies with a current position of the steering wheel.

3. The control system of claim 1, wherein the controller is configured to:

determine that a single person has entered the vehicle and/or is present within the vehicle; and control, based on determining that the single person has entered the vehicle and/or is present within the vehicle, the lighting system to illuminate the central location on the passenger seat from the one or more passenger seats.

4. The control system of claim 1, wherein the controller is configured to:

determine that at least two persons have entered the vehicle and/or are present within the vehicle; and control, based on determining that at least two persons have entered the vehicle and/or are present within the vehicle, the lighting system to illuminate at least two locations on the one or more passenger seats.

5. The control system of claim 1, wherein the at least one sensor includes a first sensor disposed within the vehicle and/or a second sensor disposed on an exterior surface of the vehicle.

6. The control system of claim 1, wherein the at least one sensor includes any one of a camera, a light detection and ranging (LIDAR) sensor, and a radio detection and ranging (RADAR) sensor.

7. The control system of claim 1, wherein the controller is further configured to control the lighting system to illuminate based on one or more of:

a lighting configuration set by one of the persons; and a predetermined seating behavior of one of the persons.

8. The control system of claim 1, wherein the controller is configured to determine the number of persons entering the vehicle and/or present within the vehicle based on an input signal, that is indicative of the number of persons entering the vehicle and/or present within the vehicle, received from a software application linked with the vehicle, and wherein the software application is communicably coupled with the controller.

9. A vehicle comprising:

a frame defining an interior space; and a control system for enhancing a vehicle driving experience, the control system including:

a lighting system disposed within the vehicle, wherein the lighting system is at least configured to illuminate one or more locations on one or more passenger seats of the vehicle;

at least one sensor coupled to the frame and disposed within the interior space, wherein the at least one sensor is configured to generate an input signal indicative of a number of persons entering the vehicle and/or present within the vehicle; and a controller communicably coupled with the at least one sensor and the lighting system, the controller being configured to:

determine the number of persons entering the vehicle and/or present within the vehicle based on the input signal received from the at least one sensor; and control, based on the number of persons entering the vehicle and/or present within the vehicle, the lighting system to illuminate any one of a central location on a passenger seat from the one or more passenger seats or at least two locations on the one or more passenger seats;

an adjustment mechanism communicably coupled with the controller and operatively coupled with a steering wheel of the vehicle, wherein the adjustment mechanism is configured to slide the steering wheel along a horizontal plane to adjust a position of the steering wheel, and wherein the controller is further configured to:

control, via the adjustment mechanism, the steering wheel to dispose the steering wheel at a central position based on determining that a single person has entered the vehicle and/or is present within the vehicle; or control, via the adjustment mechanism, the steering wheel to dispose the steering wheel at any one of a left side of the central position or a right side of the central position based on determining that more than one person has entered the vehicle.

10. The vehicle of claim 9, wherein the lighting system is also configured to illuminate a steering wheel position light on a floor of the vehicle, and wherein the controller is further configured to:

control the lighting system to illuminate the steering wheel position light on the floor of the vehicle, wherein the steering wheel position light is in alignment with the steering wheel, and wherein a position of the steering wheel position light varies with a current position of the steering wheel.

11. The vehicle of claim 9, wherein the controller is configured to:

determine that a single person has entered the vehicle and/or is present within the vehicle; and control, based on determining that the single person has entered the vehicle and/or is present within the vehicle, the lighting system to illuminate the central location on the passenger seat from the one or more passenger seats.

12. The vehicle of claim 9, wherein the controller is configured to:

determine that at least two persons have entered the vehicle and/or are present within the vehicle; and control, based on determining that at least two persons have entered the vehicle and/or are present within the vehicle, the lighting system to illuminate at least two locations on the one or more passenger seats.

13. A method for enhancing a vehicle driving experience, the method comprising:

generating, by at least one sensor associated with a vehicle, an input signal indicative of a number of persons entering the vehicle and/or present within the vehicle;

determining, by a controller associated with the vehicle, the number of persons entering the vehicle and/or present within the vehicle based on the input signal received from the at least one sensor, wherein the controller is communicably coupled with the at least one sensor and a lighting system disposed within the vehicle, and wherein the lighting system is at least configured to illuminate one or more locations on one or more passenger seats of the vehicle; and controlling, by the controller, the lighting system to illuminate any one of a central location on a passenger seat from the one or more passenger seats or at least two locations on the one or more passenger seats based on the number of persons entering the vehicle and/or present within the vehicle;

wherein an adjustment mechanism of the vehicle is communicably coupled with the controller and operatively coupled with a steering wheel of the vehicle, and wherein the adjustment mechanism is configured to slide the steering wheel along a horizontal plane to adjust a position of the steering wheel, the method further comprising:

controlling, by the controller, the adjustment mechanism to dispose the steering wheel at a central position based on determining that a single person has entered the vehicle and/or is present within the vehicle; or controlling, by the controller, the adjustment mechanism to dispose the steering wheel at any one of a left side of the central position or a right side of the central position based on determining that more than one person has entered the vehicle.

14. The method of claim 13, wherein the lighting system is also configured to illuminate a steering wheel position light on a floor of the vehicle, the method further comprising:

controlling, by the controller, the lighting system to illuminate the steering wheel position light on the floor of the vehicle, wherein the steering wheel position light is in alignment with the steering wheel, and wherein a position of the steering wheel position light varies with a current position of the steering wheel.

15. The method of claim 13, wherein controlling, based on the number of persons entering the vehicle and/or present within the vehicle, the lighting system to illuminate any one of the central location on the passenger seat from the one or more passenger seats or at least two locations on the one or more passenger seats includes:

determining, by the controller, that a single person has entered the vehicle and/or is present within the vehicle; and controlling, by the controller, the lighting system to illuminate the central location on the passenger seat from the one or more passenger seats based on determining that the single person has entered the vehicle and/or is present within the vehicle.

16. The method of claim 13, wherein controlling, based on the number of persons entering the vehicle and/or present within the vehicle, the lighting system to illuminate any one of the central location on the passenger seat from the one or more passenger seats or at least two locations on the one or more passenger seats includes:

determining, by the controller, that at least two persons have entered the vehicle and/or are present within the vehicle; and controlling, by the controller, the lighting system to illuminate at least two locations on the one or more passenger seats based on determining that at least two persons have entered the vehicle and/or are present within the vehicle.

17. The method of claim 13, wherein determining, by the controller, the number of persons entering the vehicle and/or present within the vehicle includes:

receiving, by the controller, an input signal, that is indicative of the number of persons entering the vehicle and/or present within the vehicle, from a software application linked with the vehicle, wherein the software application is communicably coupled with the controller; and determining the number of persons entering the vehicle and/or present within the vehicle based on a receipt of the input signal from the software application.

* * * * *